(12) United States Patent
Wischmeyer

(10) Patent No.: US 9,459,120 B2
(45) Date of Patent: Oct. 4, 2016

(54) METHODS AND SYSTEMS FOR DISPLAYING FLIGHT INFORMATION

(71) Applicant: Gulfstream Aerospace Corporation, Savannah, GA (US)

(72) Inventor: Carl Edward Wischmeyer, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/280,922

(22) Filed: May 19, 2014

(65) Prior Publication Data
US 2016/0123763 A1    May 5, 2016

(51) Int. Cl.
| G05D 1/00 | (2006.01) |
| G05D 3/00 | (2006.01) |
| G06F 7/00 | (2006.01) |
| G01C 23/00 | (2006.01) |
| H04L 29/08 | (2006.01) |
| G06F 3/0484 | (2013.01) |
| G06F 3/0481 | (2013.01) |

(52) U.S. Cl.
CPC ........... G01C 23/005 (2013.01); G06F 3/0481 (2013.01); G06F 3/04842 (2013.01); H04L 67/12 (2013.01)

(58) Field of Classification Search
CPC .. G01C 23/00; G01C 23/005; G05D 1/0607; G06F 3/0481; G06F 3/04842; H04L 67/12
USPC ........ 701/3, 4, 7, 11, 14; 340/945, 971, 973, 340/979
See application file for complete search history.

(56) References Cited

U.S. PATENT DOCUMENTS

| 2,559,429 | A | * | 7/1951 | Hewes | G08G 5/00 116/324 |
| 4,149,148 | A | * | 4/1979 | Miller | G01C 23/005 340/973 |
| 4,229,725 | A | * | 10/1980 | Reilly | G05D 1/063 244/182 |
| 4,247,843 | A | * | 1/1981 | Miller | G01C 23/005 116/DIG. 43 |
| 5,225,829 | A | * | 7/1993 | Bateman | G05D 1/0676 244/181 |
| 6,038,498 | A | * | 3/2000 | Briffe | G01C 23/00 244/1 R |
| 6,995,690 | B1 | * | 2/2006 | Chen | G01C 23/00 340/961 |
| 7,010,398 | B2 | * | 3/2006 | Wilkins, Jr. | G01C 23/005 244/75.1 |
| 8,600,675 | B1 | * | 12/2013 | Borghese | G01C 23/00 701/528 |

(Continued)

Primary Examiner — Khoi Tran
Assistant Examiner — Jorge Peche
(74) Attorney, Agent, or Firm — Lorenz & Kopf, LLP (LK Global)

(57) ABSTRACT

Avionics systems, controllers, and methods are provided. An avionics system includes a display and a controller. The controller is communicatively coupled with the display. The controller is configured to generate a flight clearance portion of the image including flight clearance information and to generate a flight progress portion of the image including flight progress information.

9 Claims, 5 Drawing Sheets

(56) References Cited

U.S. PATENT DOCUMENTS

| | | | | |
|---|---|---|---|---|
| 8,694,184 B1* | 4/2014 | Boorman | | G01C 23/00 340/945 |
| 9,020,665 B1* | 4/2015 | Espenes | | B64D 45/00 701/14 |
| 9,043,051 B1* | 5/2015 | Barber | | B64C 19/00 701/11 |
| 2003/0004619 A1* | 1/2003 | Carriker | | G05D 1/101 701/3 |
| 2003/0132860 A1* | 7/2003 | Feyereisen | | G01C 23/00 340/973 |
| 2003/0193410 A1* | 10/2003 | Chen | | G01C 23/005 340/971 |
| 2003/0229426 A1* | 12/2003 | Griffin, III | | G01D 7/04 701/3 |
| 2004/0107028 A1* | 6/2004 | Catalano | | B64D 45/0015 701/2 |
| 2005/0007261 A1* | 1/2005 | Berson | | G01C 23/00 340/945 |
| 2005/0085959 A1* | 4/2005 | Feyereisen | | G01C 23/005 701/14 |
| 2005/0143871 A1* | 6/2005 | Boorman | | G01C 23/00 701/3 |
| 2006/0265109 A1* | 11/2006 | Canu-Chiesa | | B64D 43/00 701/3 |
| 2007/0150178 A1* | 6/2007 | Fortier | | G08G 5/0034 701/467 |
| 2007/0164877 A1* | 7/2007 | Mumaw | | G01C 23/00 340/973 |
| 2008/0140270 A1* | 6/2008 | Davis | | G01C 21/00 701/8 |
| 2008/0195309 A1* | 8/2008 | Prinzel, III | | G01C 23/00 701/532 |
| 2008/0262664 A1* | 10/2008 | Schnell | | G01C 23/00 701/4 |
| 2009/0062972 A1* | 3/2009 | Boorman | | G01D 7/00 701/3 |
| 2009/0143968 A1* | 6/2009 | Truitt | | G08G 5/0082 701/120 |
| 2009/0150012 A1* | 6/2009 | Agam | | G08G 5/0034 701/3 |
| 2010/0114406 A1* | 5/2010 | DeJonge | | G01C 23/00 701/3 |
| 2011/0118908 A1* | 5/2011 | Boorman | | G08G 5/0021 701/14 |
| 2012/0066617 A1* | 3/2012 | Gupta | | G08G 5/0021 715/752 |
| 2012/0078447 A1* | 3/2012 | McGuffin | | G08G 5/0013 701/3 |
| 2012/0253557 A1* | 10/2012 | Min | | B64C 13/16 701/3 |
| 2013/0013133 A1* | 1/2013 | Walter | | G08G 5/0021 701/11 |
| 2013/0027226 A1* | 1/2013 | Cabos | | G08G 5/0013 340/961 |
| 2013/0211635 A1* | 8/2013 | Bourret | | B64C 19/00 701/14 |
| 2015/0019047 A1* | 1/2015 | Chandrashekarappa | | B64D 43/00 701/3 |

* cited by examiner

METHODS AND SYSTEMS FOR DISPLAYING FLIGHT INFORMATION

TECHNICAL FIELD

The technical field relates generally to aviation and methods of displaying flight information, and more particularly relates to avionics systems and methods of presenting flight clearance information and flight progress information in a single image.

BACKGROUND

As modern aviation advances, the demand for ever-increasing flight envelopes and pilot performance grows. To help meet this demand on aircraft and on the pilots, modern aircraft include impressive arrays of displays, instruments, and sensors designed to provide the pilot with menus, data, and graphical options intended to enhance pilot performance and overall safety of aircraft and passengers.

A typical airplane includes a guidance panel, a flight management system (FMS), and a multi-function control display unit (MCDU). The guidance panel (sometimes called a mode control panel) is typically the primary method of controlling the autopilot of the airplane, and is typically located at the top center of the instrument panel. The FMS is a computer system that automates a wide variety of in-flight tasks to reduce the workload on the flight crew of the airplane. One task of the FMS is in-flight management of the flight plan and autopilot control of aircraft in accordance with the flight plan. The MCDU is an input/output device for the flight crew to communicate with the FMS. In order to enter a single flight clearance change in these typical systems, such as a vector, a pilot must refer to the guidance panel and multiple pages in the MCDU. Although current configurations of the FMS, guidance panel, and MCDU systems are suitable for their intended purpose, the present system is difficult to learn and is error-prone, even for experienced crews.

As such, it is desirable to provide avionics systems, controllers, and methods that provide efficient presentation and input relating to flight clearance and flight progress. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, avionics systems, and media are disclosed herein.

In a first non-limiting embodiment, an avionics system includes, but is not limited to, at least one display and a controller. The controller is communicatively coupled with the display. The controller is configured to generate a flight clearance portion of the image including flight clearance information and to generate a flight progress portion of the image including flight progress information. In a second non-limiting embodiment, a controller for an avionics system includes, but is not limited to, instructions that cooperate with a processor.

In a second non-limiting embodiment, a controller includes, but is not limited to, a processor and a memory unit operatively coupled with the processor. The memory unit has instructions. The memory unit and the processor cooperate to cause the controller to generate a flight clearance portion of an image including flight clearance information and to generate a flight progress portion of the image including flight progress information.

In a third non-limiting embodiment, a method of presenting flight information in a single image includes, but is not limited to, generating a flight clearance portion of the image and a flight progress portion of the image with a processor. The flight progress portion includes flight clearance information and the flight progress portion includes flight progress information.

BRIEF DESCRIPTION OF THE DRAWINGS

Advantages of the present embodiments will be readily appreciated as the embodiments becomes better understood by reference to the following detailed description, when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of avionics systems, controllers for avionics systems, and methods for displaying flight information are provided. In general, the disclosure herein describes generation of a displayed image that provides merged functionality from traditional guidance panels and multiple pages of multi-function control display units (MCDUs) as well as system status information typically displayed on a Primary Flight Display (PFD). By combining functions of several disparate devices and systems of traditional avionics systems, the complexity and reliance on pilot memory is reduced in the avionics system described herein. A greater understanding of the avionics systems, controllers, and methods of presenting flight information may be obtained through a review of the illustrations accompanying this application together with a review of the detailed description that follows.

Figure 1:
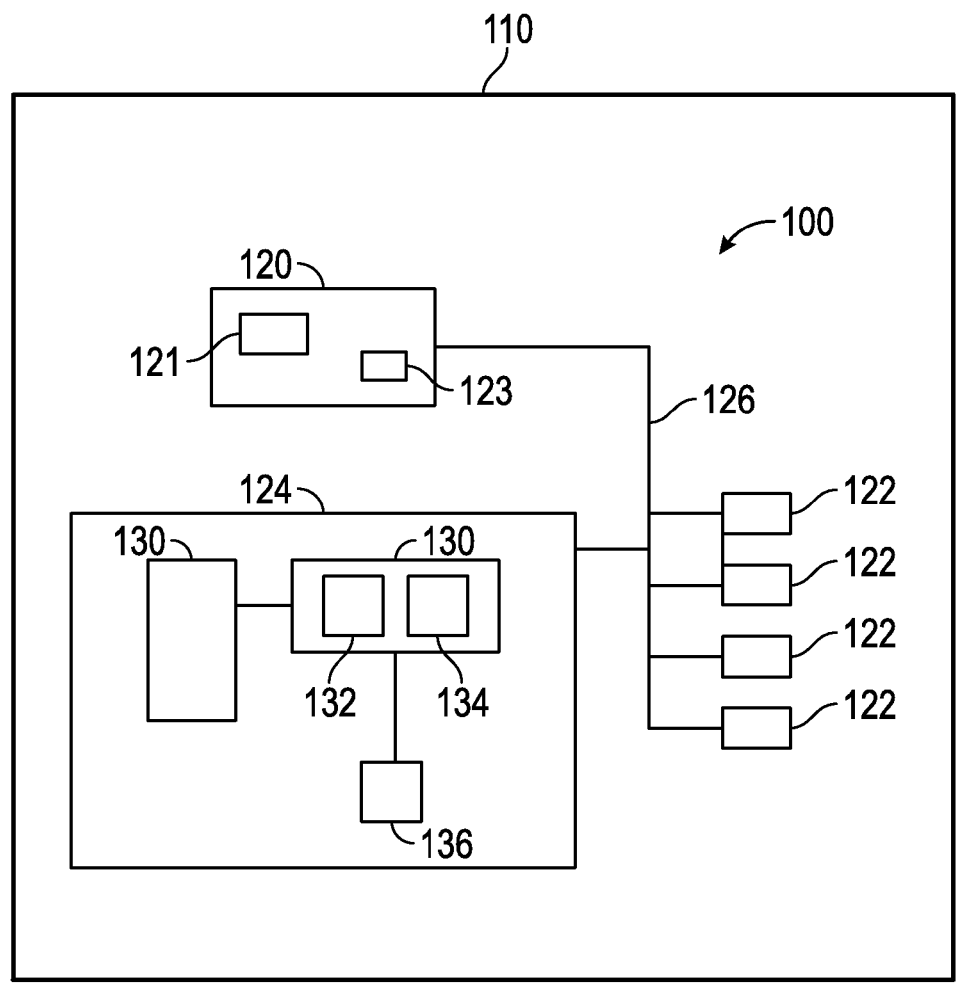
FIG. 1 is a simplified block diagram illustrating a non-limiting embodiment of an aircraft with an avionics system in accordance with the teachings of the present disclosure.

FIG. 1 is a block diagram illustrating a non-limiting embodiment of an avionics system 100 for an aircraft in accordance with teachings of the present disclosure. In the embodiment provided, avionics system 100 is located in an airplane 110. In alternative embodiments, avionics system 100 may be located in other aircraft or vehicles. For example, avionics system 100 may be located in a helicopter or airship.

Avionics system 100 includes a controller 120, a plurality of aircraft components 122, and a user interface 124. An interconnect 126 communicatively couples controller 120, aircraft components 122, and user interface 124 for electronic communication. In the example provided, interconnect 126 is a communication or network bus, as will be appreciated by those with skill in the art. It should be appreciated that any suitable network topology or physical medium may be utilized for electronic communication in avionics system 100.

Controller 120 is a hardware device that carries out instructions of a computer program, as is well known to those skilled in the art. In the example provided, controller 120 executes the computer program to provide the functions of a traditional flight management system (FMS) in addition to generating the image described below. Controller 120 may be implemented with one or more central processing units ("CPUs"), a microprocessor, an application specific integrated circuit ("ASIC"), a microcontroller, and/or other suitable device. Controller 120 includes one or more memory units 121 that store electronic data and computer programs. For example, memory units 121 may be flash memory, spin-transfer torque random access memory (STT-RAM), magnetic memory, phase-change memory (PCM), dynamic random access memory (DRAM), or other suitable electronic storage media. In the example provided, memory units 121 store control logic with instructions that cooperate with a processor 123 of controller 120 to perform operations of the method described below. Furthermore, controller 120 may utilize multiple hardware devices as is also appreciated by those skilled in the art.

Aircraft components 122 may be components that directly control flight of airplane 110, components that monitor flight status of airplane 110, or other components related to operations of airplane 110. For example, aircraft components 122 may include inertial reference units, GPS receivers, VOR and ILS receivers, air data computers, attitude/heading reference units (AHRS), magnetometers, their associated processors, MCDUs, other user interface devices, and other avionics components known to those with skill in the art. It should be appreciated that numerous other components 122 may be utilized in operation of airplane 110. Components 122 may send information, data, and/or commands to controller 120, and vice-versa. For example, a component 122 may send position status or operational status to controller 120, as will be appreciated by those with skill in the art.

User interface 124 sends information to, and receives user inputs from, pilots and crew of airplane 110. User interface 124 includes displays 130 and input devices 136. Displays 130 are electronic displays that are electronically coupled with controller 120 to visually present information and data according to electronic signals generated by controller 120. For example, displays 130 may include cathode ray tubes ("CRT"), light-emitting diodes ("LED"), plasma panels, liquid crystal displays ("LCD"), projected images from a Digital Light Processing ("DLP") projector, and/or any other suitable electronic display technology. Although described with reference to multiple displays 130, it should be appreciated that the user interface 124 may alternatively include a single display.

In the example provided, displays 130 include one or more primary flight displays 132 and one or more multi-function displays 134, as will be appreciated by those with skill in the art. Primary flight displays 132 and multi-function displays 134 may include multiple touchscreens. The touchscreen displays include sensors that detect contact by a user or other object with a screen of the touchscreen displays. The touchscreen displays further communicate the coordinates of the contact to controller 120, such as by an electronic signal over interconnect 126. Controller 120 associates the coordinates with a predefined user input and generates appropriate system commands based on the predefined user input. For example, the predefined user input may be associated with an input button displayed at the coordinates on the touchscreen.

Input devices 136 may include trackballs, control sticks, or other suitable cursor control devices for the pilot or crew to communicate with controller 120. In some embodiments, input devices 136 are microphones for voice recognition, or may be integrated with the touch capabilities of a touch screen display, such as displays 130. It should be appreciated that other input devices 136 may be utilized without departing from the scope of the present disclosure.

Figure 2:
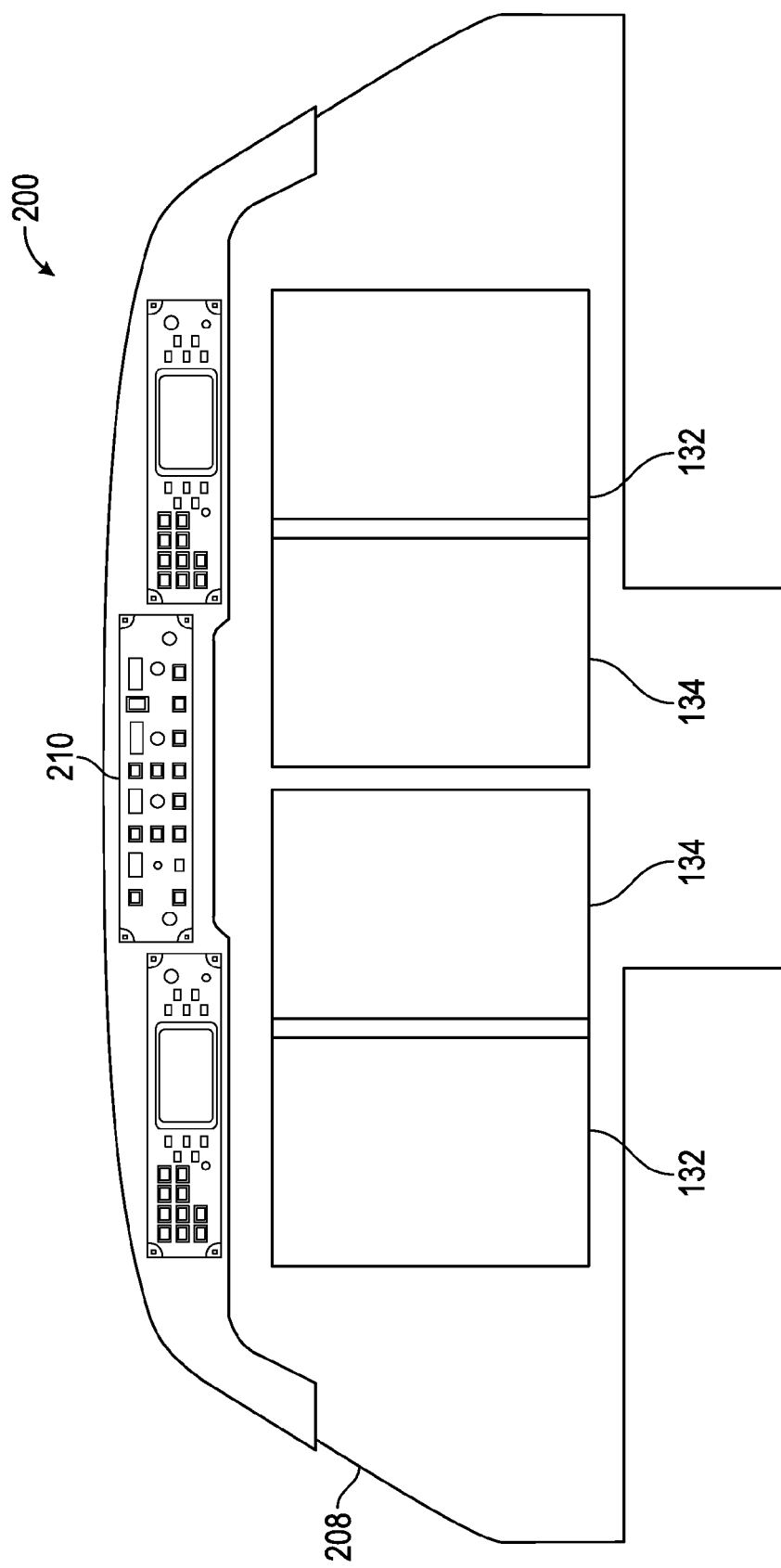
FIG. 2 is a front view illustrating a non-limiting embodiment of a cockpit of the aircraft of FIG. 1 in accordance with the teachings of the present disclosure.

FIG. 2 is a front view illustrating a non-limiting embodiment of a cockpit 200 of aircraft in accordance with teachings of the present disclosure. Cockpit 200 includes an instrument panel 208 with an example of an arrangement of primary flight displays 132, multi-function displays 134, and a guidance panel 210.

Figure 3:
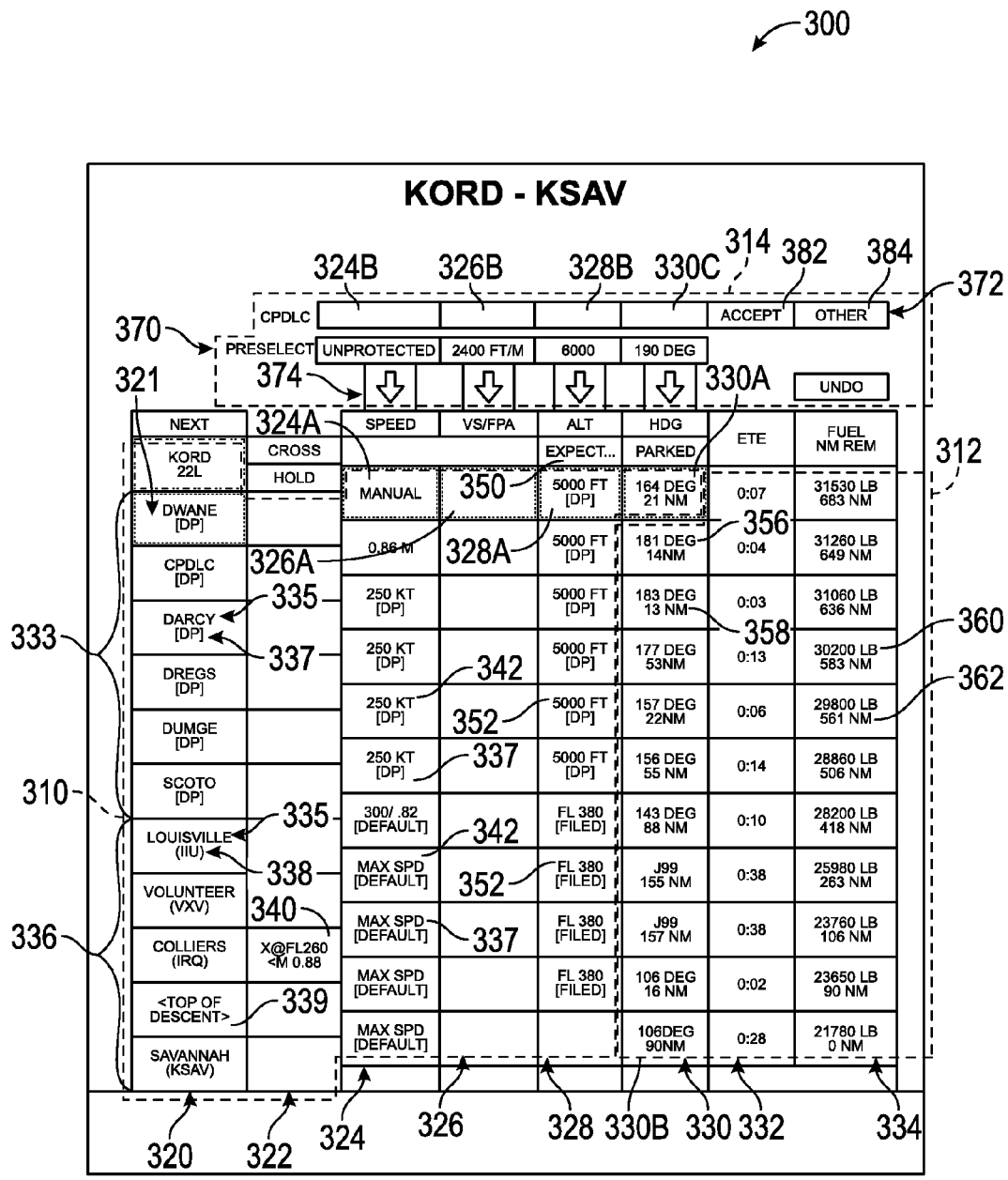
FIG. 3 is a front view illustrating a non-limiting embodiment of an image generated by the avionics system of FIG. 1 in accordance with the teachings of the present disclosure.

Cockpit 200 does not require, but may include a multi-function control display unit (MCDU) (not illustrated). Similarly, guidance panel 210 may be omitted from cockpit 200. For example, the image described below in FIG. 3 presents the same information and receives the same input as guidance panel 210 and an MCDU. It should be appreciated that cockpit 200 may have different configurations and may include additional or fewer components without departing from the scope of the present disclosure.

FIG. 3 is a front view illustrating a non-limiting embodiment of an image 300 in accordance with teachings of the present disclosure. In the example provided, image 300 is generated by controller 120 and is presented on multi-function flight displays 134. The single image 300 presents information and receives inputs that were traditionally available only by use of multiple displays and screens. For example, the information presented and inputs received on image 300 have traditionally required two different pages on a traditional FMS (e.g., a flight plan page and a flight progress page) in addition to knobs, buttons, and displays from a guidance panel.

Image 300 includes a flight clearance portion 310, a flight progress portion 312, and an adjustment input portion 314. Portions 310, 312, and 314 cooperate to display standard air navigation information, such as a waypoint column 320, a restriction column 322, an airspeed column 324, a vertical speed column 326, an altitude column 328, a heading column 330, an estimated time column 332, a fuel and distance remaining column 334, and possibly more or fewer columns, as known to those skilled in the art. Each of columns 320, 324, 326, 328, 330, 332, and 334 includes a vertical line of cells that form one or more of the portions 310, 312, and 314, as will be described below. In the example provided, the cells of image 300 that may be edited by a pilot are presented with a separate color or background than those that a pilot may not edit. For example, a preselected airspeed cell may be white to indicate that a pilot may enter a value, whereas an estimated time cell may be a darker color to indicate that the estimated time cell is automatically calculated, rather than entered by a pilot, as will be appreciated with reference to the description below.

Flight clearance portion 310 displays a clearance that is based on a filed flight plan. During a flight, a pilot complies with an air traffic control (ATC) clearance. The clearance includes vectors and assignments (e.g., speed, altitude, altitude rates, crossing restrictions, offsets, holds, etc) that are not part of the filed flight plan. The flight plan and/or clearance may be entered by a variety of techniques. For example, a clearance may be entered wirelessly directly from a service provider, uploaded from a portable device, or may be manually entered by the flight crew using the flight deck user interface devices. Image 300 and flight clearance portion 310 include features that alleviate pilot workload related to entry of flight clearance data into computer systems of an aircraft.

In the example provided, flight clearance portion 310 includes all of the cells of waypoint column 320, all of the cells of restriction column 322, a first portion 324A of airspeed column 324, a first portion 326A of vertical speed column 326, a first portion 328A of altitude column 328, and a first portion 330A of heading column 330. The cells of flight clearance portion 310 are editable, where the top cell may be edited to enter commands that the plane will carry out immediately, and the other cells may be edited to indicate what the airplane will do upon reaching the respective portion of the flight. The top cells of portions 324A, 326A, 328A, and 330A include additional visual cues to indicate what airplane 110 is currently doing. In the example provided, the visual cues are double borders. It should be appreciated that the visual cues may be a colored border, a thicker border, a colored background or text, or other suitable visual cue.

Waypoint column 320 presents a sequence of geographical positions on the ground over which airplane 110 has been cleared to fly. The cells of waypoint column 320 that are within a first range 333 include a waypoint name 335 displayed above a source indicator 337, and the cells of waypoint column 320 that are within a second range 336 include waypoint name 335 displayed above a waypoint identifier 338. Waypoint names 335 are associated with navigational radio aids or other geographic identifiers, as will be appreciated by those with skill in the art.

The top two cells of waypoint column 320 include additional visual cues. The topmost cell (e.g., KORD cell) includes a unique indicator that is different from the visual cues discussed above for portions 324A, 326A, 328A, and 330A. The unique indicator identifies the waypoint that airplane 110 most recently passed. In the example provided, the unique identifier is a unique border, but it should be appreciated that different color borders, cells, text, or other cues may be incorporated without departing from the scope of the present disclosure. The second cell from the top (e.g., DWAYNE) includes the same visual cue discussed above for portions 324A, 326A, 328A, and 330A. This same visual cue indicates that this second cell from the top is the next waypoint through which airplane 110 will travel.

Source indicators 337 indicate how the waypoints were entered into the clearance, where available. For example, cells within first range 333 include source indicators "[DP]" to identify that the waypoints in first range 333 originated from a departure procedure corresponding to the takeoff airport of the current flight. Contact identifiers 338 of waypoint column 320 in second range 336 indicate the VHF Omnidirectional Range (VOR) navigational system which provides guidance for that leg, as will be appreciated by those with skill in the art. Contact identifiers 338 may originate from, for example, a filed flight plan on which the clearance is based. In the example provided, waypoint column 320 further includes phase markers 339 that indicate flight phase changes or other milestones during the flight. For example, phase marker 339 illustrated indicates the top or beginning of the descent phase of the flight.

Restriction column 322 includes information related to crossing restrictions and holds in the clearance. For example, a crossing restriction cell 340 of restriction column 322 indicates that airplane 110 should cross the COLLIERS VOR at flight level 260 at a speed that is below Mach 0.88. Similarly, holding instructions may be entered to indicate when a holding pattern should be flown at particular waypoints, as will be appreciated by those with skill in the art.

Airspeed column 324 includes airspeed cells that indicate the airspeed that airplane 110 should maintain along the flight. The airspeed cells are offset vertically from the cells of waypoint column 320 to indicate the courses between the waypoints. In alternative embodiments, the airspeed and other cells are vertically aligned in the same row as the waypoint cell of column 320 without a vertical offset to indicate the airspeed used to reach the respective waypoint cell. Similarly, each of the remaining columns may be vertically offset or vertically aligned with waypoint column 320. Each of the cells in first portion 328A of airspeed column 324 includes a speed target 342 and source indicator 337 unless airspeed is under manual control. When airspeed or other values are under manual control, the respective cell will indicate such manual control, such as by displaying "MANUAL." Speed targets 342 indicate the desired airspeed for each portion of the flight, with the uppermost cell of first portion 324A indicating the currently commanded airspeed (if any) of airplane 110. The vertical position of each of the airspeed cells at least partially aligns with cells of waypoint column 320 to indicate where along the flight the airspeeds apply. Source indicator 337 of airspeed column 324 indicates the source of speed targets 342. For example, the cells at the bottom of airspeed column 324 indicate that the airspeed "maximum speed" was provided as the default cruise speed in the FMS.

Vertical speed column 326 indicates a rate of ascent or descent of airplane 110 when changing altitude. In the example provided, the top cell of portion 326A of vertical speed column 326 indicates the currently commanded (if any) vertical speed, and the remaining cells indicate a vertical speed to be achieved at a later time during the flight. In the example provided, a vertical speed may not be entered unless a target altitude is defined, as will be described below with reference to FIGS. 4A and 4B. This same column also allows a vertical rate to be commanded by Flight Path Angle.

Altitude column 328 indicates a target altitude at which to fly for each portion of the cleared flight. Altitude column 328 includes an expected altitude button 350 and altitude cells that display an altitude target 352 and source indicator 337. Expected altitude button 350 may be utilized to enter an altitude that air traffic control has indicated will be expected after a stated period of time, as will be appreciated by those with skill in the art. In some embodiments, expected altitude button 350 is omitted.

Source indicators 337 of altitude column 328 indicate the source of altitude target 352. In the example provided, source indicators 337 indicate that various altitude targets 352 originate from the departure procedure ([DP]) or from the filed flight plan ([FILED]).

First portion 330A of heading column 330 indicates the distance and course of the current leg that the airplane is flying. If the airplane is on a vector, first portion 330A of heading column 330 will show that vector. The top cells of first portions 324A, 326A, and 328A will be blank, indicating clearly to the pilot that the vector is not part of the "normal" clearance. When those top cells of the first portions are blank, the currently commanded speed, vertical speed, and altitude (if any) will be shown one line down with visual cues to indicate that those cells contain the current command. To further reinforce this, a next waypoint cell 321 located one cell down from the top of waypoint column 320 will say "VECTOR/RESUME" to indicate that the aircraft is on a vector, and that clicking on the VECTOR/RESUME cell will cause the airplane to abandon the vector and resume the displayed clearance. There are numerous variations on this scheme, such as commanding an intercept, as will be appreciated by those skilled in the art.

Flight progress portion 312 of image 300 includes a second portion 330B of heading column 330, all of the cells of estimated time column 332, and all of the cells of fuel/distance remaining column 334. Cells in second portion 330B of heading column 330 display a course 356 and a distance 358 traveled of that leg. The cells in second portion 330B at least partially align with cells of waypoint column 320 to indicate where in the flight the course and distance apply.

Estimated time column 332 displays an estimated time en-route (ETE) that airplane 110 will be flying each leg of the flight based on the corresponding cell in airspeed column 324 and the information from heading column 330. Fuel remaining column 334 displays cells that estimate an amount of fuel 360 remaining at each waypoint and the distance remaining to the planned destination. It should be appreciated that amount of fuel 360 remaining is shown for illustration only, and does not necessarily reflect a realistic amount of fuel or fuel usage rate.

Adjustment input portion 314 of image 300 includes a preselect row 370, a controller pilot data link communication (CPDLC) row 372, and a row of clearance entry buttons 374 for entering adjustments and vectors to flight clearance portion 310. Preselect row 370 and CPDLC row 372 include cells that form a second portion 324B of airspeed column 324, a second portion 326B of vertical speed column 326, a second portion 328B of altitude column 328, and a third portion 330C of heading column 330.

Preselect row 370 is a row of fields for pre-setting airspeed, altitude, heading, and vertical speed. A pilot may enter a value in preselect row 370 that will be entered into the clearance at a future time by use of the corresponding clearance entry button 374. For example, if a pilot knows that a climb to 6,000 feet is expected in the future, the pilot may select the cell at the intersection of preselect row 370 and second portion 328B of altitude column 328 to enter 6,000 feet. When the preselected altitude is to be activated and entered into the clearance as a current target altitude, the pilot may then select the clearance entry button 374 that is aligned with the altitude column 328.

In the example provided, the cell of preselect row 370 that corresponds with second portion 324B of airspeed column 324 displays "unprotected" when airspeed is not controlled. For example, when autothrottles are off or when airplane 110 is in flight level change mode (FLCH), controller 120 may generate such "airspeed unprotected" warnings in various locations, as will be appreciated by those with skill in the art. Alternative texts could be "MANUAL" as shown in portion 324A of column 324, "OFF", or other text as known to one skilled in the art.

CPDLC row 372 presents received CPLDC data that was sent by air traffic control to airplane 110. CPDLC row 372 includes a CPDLC acceptance cell 382, an edit cell 384, and includes received clearance cells for each of portions 324B, 326B, 328B, and 330C. Clearance data sent by air traffic control (not illustrated) typically includes information such as a speed, an altitude, or a heading that are displayed in the corresponding received clearance cell. Acceptance cell 382 enters the received clearance in the corresponding columns of flight clearance portion 310. For example, a CPDLC message that instructs airplane 110 to climb to an altitude of 10,000 feet may be entered directly into the top cell of first portion 328A of flight clearance portion 310 by selection of acceptance cell 382. Edit cell 384 may be selected to edit the CPDLC message before entry into flight clearance portion 310 or to perform other actions, such as discarding the message without entry into flight clearance portion 310, or for handling a more complex CPDLC message. In the example provided, data entered from CPDLC row 372 appear as new cells or overwrite the existing cells at the top of flight clearance portion 310.

Figure 4A:
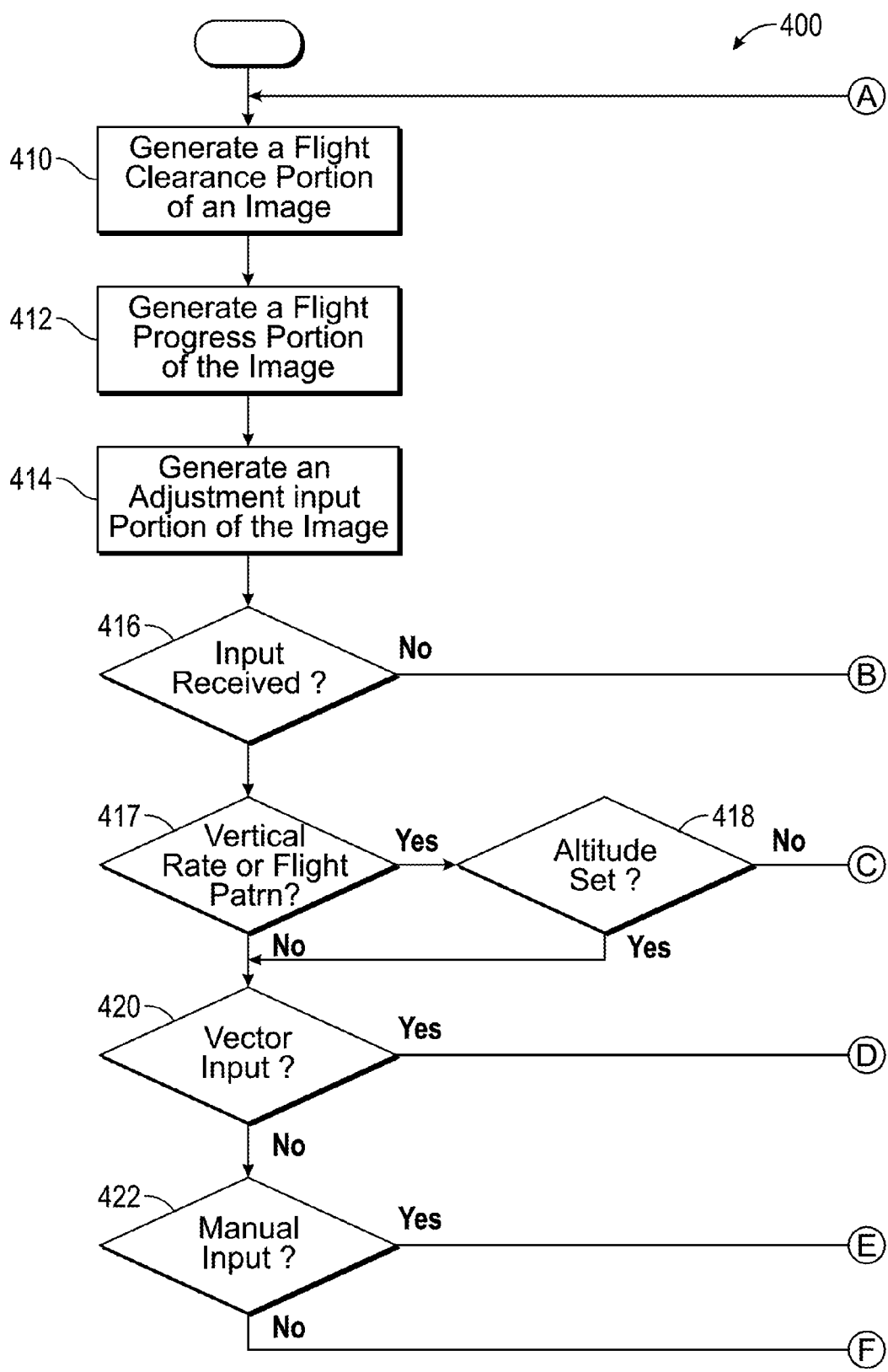
FIGS. 4A and 4B combine to make up FIG. 4, which is a flow diagram illustrating a non-limiting embodiment of a method for presenting flight information in accordance with the teachings of the present disclosure.
Figure 4B:
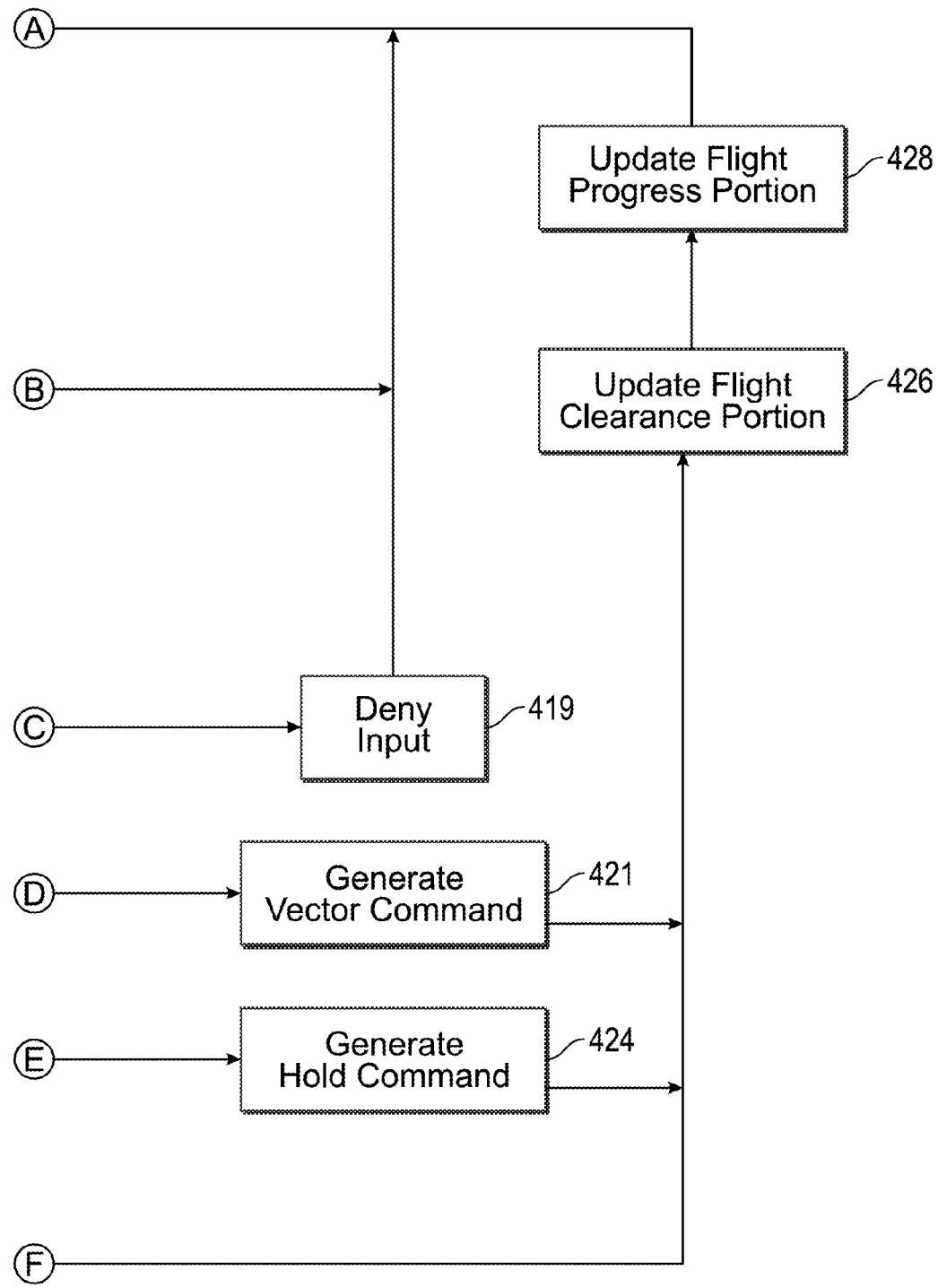

FIGS. 4A and 4B combine to make up FIG. 4, which is a flow diagram illustrating a non-limiting embodiment of a method 400 for presenting flight information in accordance with the teachings of the present disclosure. In the example provided, operations of method 400 are performed by controller 120. As described above with reference to FIGS. 1-3, controller 120 is communicatively coupled with display 134 to present image 300 for presentation of flight information. Controller 120 includes control logic with instructions that cooperate with a processor to cause the controller to perform the operations of method 400. It should be appreciated that operations of method 400 may alternatively be performed by other controllers or devices.

Operation 410 generates a flight clearance portion of an image. For example, controller 120 may generate waypoint column 320, restriction column 322, first portion 324A of airspeed column 324, first portion 326A of vertical speed column 326, first portion 328A of altitude column 328, and first portion 330A of heading column 330 to generate flight clearance portion 310 of image 300.

Operation 412 generates a flight progress portion of the image. For example, controller 120 may generate second portion 330B of heading column 330, estimated time column 332, and fuel remaining column 334 to generate flight progress portion 312 of image 300.

Operation 414 generates an adjustment input portion of the image. For example, controller 120 may generate second portion 324B of airspeed column 324, second portion 326B of vertical speed column 326, second portion 328B of altitude column 328, third portion 330C of heading column 330, CPDLC acceptance cell 382, edit cell 384, and clearance entry buttons 374 to generate adjustment input portion 314 of image 300.

Operation 416 determines whether an input has been received from the flight crew. For example, controller 120 may determine whether a pilot has selected a cell or button from flight clearance portion 310 or from adjustment input portion 314. When no input has been received, method 400 returns to operation 410.

When input has been received, method 400 advances to operation 417 to determine whether the input is a vertical rate command or a flight path command. For example, controller 120 may determine whether the input is received from vertical speed column 326 to determine whether the input is a vertical rate command or flight path angle command. When the input is a vertical rate or flight path angle command, method 400 proceeds to operation 418 to determine whether a target altitude is set. For example, controller 120 may determine whether a value is entered in the corresponding cell of altitude column 328. When there is a lack of target altitude (e.g., no target altitude is set), or if the vertical speed takes the airplane away from the target altitude, operation 419 denies the input and returns method 400 to operation 410. An alternative implementation allows the flight crew to enter the vertical rate before entering the altitude.

When operation 417 determines that the input is not a vertical rate or flight path, or when operation 418 determines that an appropriate target altitude is set, method 400 proceeds to operation 420 to determine whether the input is a vector input. For example, controller 120 may determine that an input is a vector input when the input is entered from first portion 330A of heading column 330. When the input is a vector input, operation 421 generates the equivalent of a guidance panel heading hold command, which is referred to herein as a vector command. For example, controller 120 may command an autopilot system of airplane 110 to continue on a heading entered by CPLDC row 372 to generate the vector command.

When the input is not a vector input, method 400 proceeds to operation 422 to determine whether the input is a manual input. For example, controller 120 may determine that the input is a manual input when a pilot selects a top cell of first portions 324A, 326A, or 328A of flight clearance portion 310 and enters a command into one or more of those cells. When the input is a manual input, method 400 proceeds to operation 424 to generate a hold command. In some embodiments, the hold command holds based on procedures with non-constant legs, such as curved RNP procedures. For example, controller 120 may generate a command to the autopilot system of airplane 110 to hold an altitude of 6000 feet when a pilot enters a different value into the top cell of first portion 328A of altitude column 328. Other examples include generating the hold command to maintain a constant airspeed in response to selection of a cell of the first portion of the airspeed column, to maintain a constant altitude in response to selection of a cell of the first portion of the altitude column, and, as described above, to hold a vertical speed while seeking the specified altitude.

When operations 421 or 424 are complete, method 400 proceeds to operation 426. Similarly, method 400 proceeds to operation 426 when operation 422 determines that the input is not a manual input. Operation 426 updates the flight clearance portion. For example, controller 120 may replace existing cells of flight clearance portion 310 or may insert additional rows or cells between existing cells of flight clearance portion 310 according to the received input. Such insertion of additional rows and cells may be a response to an input from an FMS flight plan that adds sequence legs to the flight clearance portion. For example, the input may cause curved RNP procedures to be loaded and subsequently used in navigation of the airplane.

Updating the flight clearance portion further normally includes removing cells from the top of the flight clearance portion when the respective leg of the flight has been completed. Accordingly, method 400 and image 300 provide one example of explicitly presenting vectors and assignments within the clearance, as will be appreciated by those with skill in the art.

Operation 428 updates the flight progress portion. For example, controller 120 may update estimated time column 332 based on first portion 324A of airspeed column 324. As the flight progresses, waypoints and previous flight data disappear from the top of flight clearance portion 310 and flight progress portion 312. In the example provided, method 400 repeats to continuously present image 300 on display 134.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionics system, comprising:
a display; and
a controller communicatively coupled with the display to present an image, the controller configured to:
generate a flight clearance portion of the image including flight clearance information,
generate a flight progress portion of the image including flight progress information,
generate an adjustment input portion of the image, wherein the controller is further configured to generate a second portion of an airspeed column, a second portion of a vertical speed column, a second portion of an altitude column, a third portion of a heading column, or combinations thereof to generate the adjustment input portion of the image, and
adjust the flight clearance portion in response to an input at the adjustment input portion of the image.

2. The avionics system of claim 1, wherein the controller is further configured to generate a second portion of a heading column, an estimated time column, a fuel remaining column, or combinations thereof to generate the flight progress portion of the image.

3. The avionics system of claim 1, wherein the controller is further configured to generate an adjustment input portion of the image and to adjust the flight clearance portion in response to an input at the adjustment input portion of the image.

4. The avionics system of claim 1, wherein the controller is further configured to generate a vector command and to update the flight clearance portion of the image to reflect a vector in response to an input at the third portion of the heading column, the second portion of the airspeed column, or combinations thereof.

5. The avionics system of claim 1, wherein the controller is further configured to generate a controller pilot data link communication (CPDLC) row, a preselect row, or a combination thereof as the adjustment input portion of the image.

6. The avionics system of claim 1, wherein the controller is further configured to deny input of a vertical rate command, a flight path command, or a combination thereof in response to determining that no target altitude is set.

7. The avionics system of claim 1, wherein the controller is further configured to generate a warning that communicates to a pilot that airspeed is unprotected in response to the aircraft being in a mode where airspeed is not controlled.

8. An avionics system, comprising:
a display; and
a controller communicatively coupled with the display to present an image, the controller configured to:
generate a flight clearance portion of the image including flight clearance information, wherein the controller is further configured to generate a waypoint column, a restriction column, a first portion of an airspeed column, a first portion of a vertical speed column, a first portion of an altitude column, a first portion of a heading column, or combinations thereof to generate the flight clearance portion of the image, generate a flight progress portion of the image including flight progress information, generate an adjustment input portion of the image, and adjust the flight clearance portion in response to an input at the adjustment input portion of the image, and wherein the controller is further configured to generate a hold command to achieve and maintain a constant airspeed in response to selection of a cell of the first portion of the airspeed column, to achieve and maintain a constant altitude in response to selection of a cell of the first portion of the altitude column, to achieve and maintain a constant vertical speed or a constant flight path angle in response to selection of a cell of the first portion of the vertical speed column, and to achieve and maintain a constant heading in response to selection of a cell of the first portion of the heading column.

9. An avionics system comprising:

a display; and a controller communicatively coupled with the display to present an image, the controller configured to:

generate a flight clearance portion of the image including flight clearance information, generate a flight progress portion of the image including flight progress information, generate an adjustment input portion of the image, adjust the flight clearance portion in response to an input at the adjustment input portion of the image, wherein the controller is further configured to generate a controller pilot data link communication (CPDLC) row, a preselect row, or a combination thereof as the adjustment input portion of the image, generate received CPDLC data in the CPDLC row, generate an accept CPDLC data button of the image, and generate a vector command in response to actuation of the accept CPDLC data button.

* * * * *